Feb. 28, 1967 L. H. YOUNG 3,307,160

MAGNETIC MEMORY MATRIX

Filed Dec. 24, 1963 2 Sheets-Sheet 1

INVENTOR
L. H. YOUNG
BY
William H. Kamstra
ATTORNEY

Feb. 28, 1967 L. H. YOUNG 3,307,160

MAGNETIC MEMORY MATRIX

Filed Dec. 24, 1963 2 Sheets-Sheet 2

3,307,160
MAGNETIC MEMORY MATRIX

Lawrence H. Young, Emmaus, Pa., assignor to Bell Telephone Laboratories, Incorporated, New York, N.Y., a corporation of New York Filed Dec. 24, 1963, Ser. No. 333,134
7 Claims. (Cl. 340—174)

This invention relates to magnetic memory arrangements, and particularly to memory arrangements in which information storage and readout are accomplished by a combination of permanent magnet patterns and magnetic wire memory elements.

Magnetic memory arrangements in which binary information is stored in word-organized patterns of permanent magnets disposed at particular crosspoints of a coordinate memory array are well known in the art. Such a memory arrangement is disclosed, for example, in the copending application of C. F. Ault et al., Serial No. 311,424, filed September 25, 1963. Interrogation of the information in such a memory is accomplished by an array of magnetic wire memory elements parallelly arranged along one of the coordinates of the array. The wire memory elements advantageously are of the character described in Patent No. 3,083,353 of A. H. Bobeck, issued March 26, 1963, and comprise, in one form, an electrical conductor having a magnetic tape helically wound therearound. The tape is of a magnetic material having substantially rectangular hysteresis characteristics so that segments thereof may be remanently magnetized by external magnetic fields applied thereto. Because of the helical coupling of the tape to its axial conductor, a voltage is induced across the ends of the latter element each time a flux switching occurs in a segment of the tape, as is well known.

When magnetic wire memory elements are employed in a memory arrangement in association with a pattern of permanent magnets, the magnets are arranged, where they appear at the crosspoints of the memory array, in inductive coupling with the tapes of the coordinately arranged wire memory elements. A plurality of interrogating drive conductors, or solenoids, are arranged transversely to the wire memory elements in the other coordinates of the array. These solenoids define the word rows of the memory and, when selectively energized, apply interrogating fields to each of the segments of the wire memory element tapes which they also define. Where no permanent magnets appear at a bit location of the word row defined by an energized solenoid, a flux switching occurs in the coupled segment with an output voltage being induced across the coupled conductor. Where, however, a permanent magnet has its field in coupling with an associated segment, the segment is prevented from switching and no signal, or at most a negligible shuttle signal, is induced in the coupled conductor. Conventionally, the two signal conditions thus produced are representative of the storage in the interrogated word row of a binary "1" and "0," respectively.

In a memory arrangement such as briefly considered in the foregoing, the permanent magnets may be affixed to a nonmagnetic sheet or plate for ready replacement and change of the stored information. Advantageously, the interrogation of such a memory is nondestructive; after a current pulse of one polarity is applied to a selected interrogating solenoid, it is followed immediately by a pulse of the opposite polarity which resets the tape segments which were switched by the earlier current pulse. A highly advantageous permanent memory is thus achieved which, as demonstrated by the high-capacity memory disclosed in the aforementioned copending application of C. F. Ault et al., meets many of the demands of high speed data processing and other information handling systems.

In the memory arrangement referred to in the foregoing, the interrogating drive solenoid usually comprises a flat strip conductor which may encircle transversely a parallel grouping of wire memory elements so that inductive coupling with the magnetic tape is had at diametrically opposite points along the wire element in the forward direction of the strip conductor and in its return. On the other hand, as is the case in the memory arrangement of the aforementioned copending application of C. F. Ault et al., the interrogating solenoid may in its forward and return direction be coupled to the tapes of two sets of wire memory elements. In the latter case, the solenoid is coupled to any particular wire memory element at only one point along the tape. In either case, when the drive solenoid is energized, a magnetic field is generated along its length, which field is applied to the address segments of the memory tape defined thereon by the coupled solenoid. Relatively high interrogating fields may in this manner be developed at the center of the address segment tape, however, at the extremities of the address segment, the field applied to the tape will be considerably lower. This coupling of the drive fields to the address segments of wire memory elements thus falls short of the most efficient coupling possible. Switching properties of the material of the tape, such as the high speed with which the flux may be reversed, are accordingly not realized to the extent possible.

One memory arrangement employing magnetic wire memory elements solves this coupling problem by arranging the wire memory elements rather than the coupled solenoids to define the word rows. Such an arrangement is described, for example, in the copending application of R. W. Downing, Serial No. 110,061, filed May 15, 1961, now Patent Number 3,245,057. During an interrogation of a word row, the interrogating current pulse is applied to a selected magnetic wire memory element conductor and the information bearing output signals appear on the solenoids. However, in this prior art arrangement a distinct write phase of operation is required. The information is introduced into the memory by coincident half-select currents applied to the selected word row memory element and to predetermined ones of the bit solenoids. The information is then stored as particular magnetic polarizations in the address segments of the wire memory element tapes, which is the storage arrangement familiar in the earlier toroidal magnetic core memories. The memory arrangement of the copending application of Downing concerns itself chiefly with interaction effects encountered in such a memory during the write phase of operation.

In the memory arrangement contemplated in connection with the present invention, as is evident from the foregoing, no write phase is necessary since the stored information is permanently present in the form of permanent magnets. The problem of interaction effects encountered in memories as taught in the application of Downing during a write phase thus does not exist in the memories presently being considered. However, these interaction effects are present in permanent magnet-wire memory element memories during readout and the problem of achieving efficient coupling between the memory elements and the word row solenoids mentioned hereinbefore is aggravated by the fact that the coupled fields, in order to cause a flux switching at interrogated address segments of the memory elements, must overcome effects tending to resist such switching. Any flux induced in the relatively short address segments defined on the memory tape by a coupled solenoid finds a closure path through air. The reluctance of this air closure path is large compared with that of the magnetic material of which the memory tape is fabricated with the result that the flux closure field asserts a demagnetizing effect on the address segment. The interaction of the oppositely directed flux of the buffer regions separating the address segments also resists the switching of flux in the address segment. The segmenting of the magnetic wire memory element into an alternating sequence of address regions and isolating buffer regions thus increases the magnitude of the field required to switch any given address region during readout.

When output voltages are induced in the magnetic wire memory elements of prior art permanent magnet memory arrangements employing such elements, the resulting currents appear in a circuit including the conductor of the memory elements and a return conductor which is arranged parallel to the memory element in the memory array. In the present invention a similar return conductor circuit is provided for currents appearing in the memory element conductor, albeit the currents result from and are present for the completion of different operations. These currents in both instances, although of low level, cause stray magnetic fields which cumulatively may interfere with adjoining memory elements of the array to produce undesired noise signals. Although the provision of a return conductor lying parallel to the energized memory element achieves some cancellation of the currents in adjoining memory elements thus coupled, sufficient coupling remains to present a noise problem in these memories.

Each of the foregoing and other considerations, for example, access solenoid coupling, bit address interaction, and noise generation, is a concern of this invention, and it is a general object thereof to provide a magnetic memory arrangement which offers a substantial improvement in each of these areas.

More specifically, it is an object of this invention to improve the access conductor-memory element coupling in magnetic wire memory element memories employing permanent magnets as the information representative forms.

Another object of this invention is the elimination in magnetic wire memory elements of demagnetization effects, such as demagnetizing fields, of address segments defined thereon and magnetic interactions between the address segments and adjoining address buffer regions.

Still another object of this invention is the reduction of noise in magnetic memories employing magnetic wire memory elements as readout means for an information-bearing pattern of permanent magnets.

A further object of this invention is the reduction in readout cycle time and access current magnitudes in permanent magnet-wire memory element memories.

Another object of this invention is to increase the storage capacity of magnetic wire memory arrangements.

This invention also has for one of its objects the provision of a new and improved magnetic memory circuit.

The foregoing and other objects of this invention are realized in one specific illustrative memory arrangement comprising, as the information storage elements, a plurality of permanent magnets selectively disposed at particular crosspoints of a coordinate matrix. The magnets are affixed to a nonmagnetic sheet and each of the crosspoints of the matrix defines an address for the storage of a binary bit. The specific memory arrangement here contemplated is word-organized, with the bit addresses along one set of coordinates containing the individual bits of the word rows. Since the magnets are selectively arranged at only particular crosspoint bit addresses, a particular crosspoint is characterized by the presence or the absence of a permanent magnet thereat, and this characterization represents the storage of a binary "1" or "0." Thus, where no permanent magnet appears at a crosspoint address, the address stores a binary "1" and when such a magnet is present the address stores a binary "0." Clearly, such a storage of information is nondestructive and permanent since it is the physical presence or absence of a magnetic body which is representative of a binary value rather than a particular electrical state or a direction of magnetization which represents the stored information.

The information thus permanently stored is interrogated by means of an associated readout array made up of a plurality of parallel magnetic wire memory elements and a transverse arrangement of flat strip electrical solenoids. The memory elements themselves each comprises an electrical conductor having a magnetic tape helically wound therearound for its entire length, the tape being of a magnetic material having substantially rectangular hysteresis characteristics. The flat strip solenoids are also parallelly arranged—however, transversely to the magnetic memory elements. The strip solenoids pass in one direction in inductive coupling with one side of the magnetic tapes of the memory elements and return in the other direction on the other side of the magnetic tapes also in inductive coupling therewith. The memory elements and solenoids are arranged in registration with the two sets of coordinates of the crosspoint matrix and the tapes of the memory elements lie in the magnetic fields of the permanent magnets wherever they appear at the crosspoints.

In distinction from more conventional arrangements and in accordance with the principles of this invention, the magnetic wire memory elements are arranged along the word rows of the coordinate address matrix and the strip solenoids are arranged along the corresponding bit columns. When the memory arrangement of this invention is interrogated, a read current pulse is applied to a selected one of the memory elements, thereby generating a magnetic field circularly along its entire length. This field operates uniformly along the entire length of the wound tape and obviously is effective continuously at every point on the tape as it helically extends around its conductor. The direction of field generated by the read current pulse applied to the memory element is opposite to that of the flux present in the length of the tape at each interrogation. Accordingly, a flux switching is caused by the read field along the entire length of the tape rather than in discrete segments of the tape as is the case in presently known memories of the character here contemplated. At the address segments of the memory elements defined by the inductively coupled readout solenoids, the flux switching in the tape induces readout voltages in the coupled solenoids, that is, providing no permanent magnet at the defined crosspoint inhibits the flux switching. At the crosspoints of the strip solenoids and memory elements having the saturating fields of the permanent magnets coupled thereto, the segments of the tape defined by the readout solenoids are prevented from switching with the result that no significant readout voltages are induced in the solenoids. These signal conditions are conventionally indicative of the storage of binary "1's" and "0's," respectively.

It is apparent from the foregoing interrogation operation that, since the entire length of the tape is switched with the exception of the small segments held in their magnetization state by permanent magnets, the demagnetizing effects are advantageously considerably reduced. Further, as is clear from the manner in which the read current is applied, coupling losses are virtually eliminated. With the read current applied to the conductor of the wire memory element, as previously mentioned, the field thus generated affects the memory tape along its entire length as it winds about the energized conductor. The read current may thus advantageously be considerably reduced. With the reduction in interaction effects an increase in the density of bit addresses defined along a magnetic memory element by the coupled solenoid is also advantageously achieved.

The voltages induced in the readout solenoids coupled to the energized word row, that is, in those solenoids defining address segments of the crosspoint memory matrix containing binary "1's," in turn, generate readout currents which are transmitted to the circuitry external to the memory where the information-representative signals are to be utilized. The solenoids present only the inductances represented by the memory tape segments to which they are coupled. Accordingly, the impedance to the readout currents is substantially reduced when compared with known arrangements where the readout currents are generated in the memory element conductors themselves which have the tapes wound therearound for their entire lengths. Delays introduced by the impedance of the latter elements are also advantageously substantially reduced by the organization of the memory arrangement of the present invention.

It is one feature of this invention that word row drive means for interrogating a coordinate pattern of permanent magnets, the presence or absence of which is representative of stored binary information, includes a plurality of stored charge diodes. The employment of such diodes advantageously provides a bipolar interrogate current for switching the magnetic polarity of the flux of the helical tape wound about an electrical conductor of a magnetic wire memory element which comprises the word row drive means. The switching of flux is followed immediately by a current alternation in the opposite direction to restore the flux state of the helical tape and thereby prepare the magnetic tape for a subsequent interrogation.

In accordance with one advantageous feature of this invention a return circuit for the interrogating current applied to the magnetic wire memory element is provided comprising a pair of return conductors arranged parallelly with the memory element. The return conductors are equally spaced on each side of the wire memory element with the result that currents coupled into the word row memory elements adjacent to the one being energized are virtually eliminated.

The foregoing and other objects and features of this invention will be understood from a consideration of the detailed description of the organization and operation of one specific illustrative embodiment thereof which follows when taken in conjunction with the accompanying drawing in which.

Figure 1:
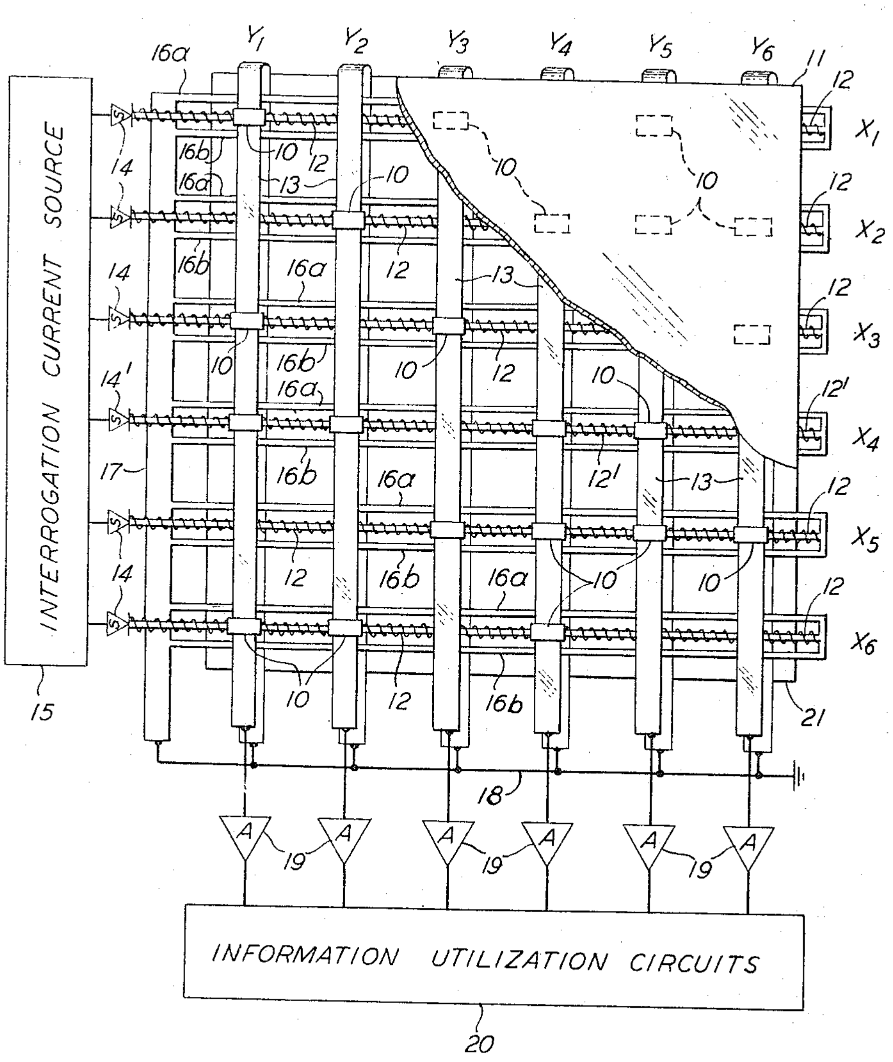
FIG. 1 depicts an illustrative single plane memory matrix according to the principles of this invention in which a portion is broken away to show the details of its organization.

Turning now to FIG. 1 of the drawing, an illustrative memory plane according to the principles of this invention is seen to comprise a coordinate arrangement of permanent bar magnets 10. The magnets 10 are coordinately arranged in that they are disposed at selected crosspoints of $x$ and $y$ coordinates in accordance with the binary information stored in the memory plane. Each of the crosspoints of the coordinate array thus defined locates a binary bit address, the presence of a magnet 10 at a crosspoint representing the storage of a binary "0" and the absence of a magnet 10 at a crosspoint representing the storage of a binary "1." The memory plane is contemplated to be word-organized, the information words being arranged along the $x$ coordinates and the corresponding bits of the words being arranged along the $y$ coordinates. For purposes of illustration, a 6 x 6 array is assumed although it will be appreciated that a memory plane may be constructed in accordance with this invention having a capacity limited only by the requirements of the system with which the memory may be adapted for use.

The bar magnets 10 are mounted on, or may be otherwise affixed, to a nonmagnetic sheet 11 of, say, aluminum. The retaining sheet 11 is depicted in the drawing as being partially broken away in order to show more clearly the details of the organization of the memory plane. According to the illustrative organization of the memory of FIG. 1, the magnets 10 are mounted on the underside of the sheet 11. As will appear hereinafter, it is only necessary that, at an address which is to store a binary "1," a permanent magnet 10 be effectively absent. Thus, an advantageous arrangement for achieving the discrimination between the two binary values may be one in which a magnetizable but unmagnetized element is mounted on the sheet 11 at each crosspoint address. At those addresses which are to contain binary "0's," the magnetizable element is permanently magnetized, leaving the remaining elements unmagnetized. Information in such a pattern of magnetizable elements may be readily changed by magnetizing and demagnetizing selected ones of the elements and a novel means for accomplishing this information change is disclosed in the copending application of C. F. Ault et al., Serial No. 266,962, filed March 21, 1963, now Patent No. 3,281,807.

The information thus stored is interrogated by means of a readout array which is arranged in registration with the $xy$ coordinate array of crosspoints. The readout array comprises a plurality of magnetic wire memory elements 12 arranged in parallel along the $x$ coordinates and a plurality of flat strip conductors, or solenoids, 13 arranged in parallel along the $y$ coordinates transverse to the elements 12. Each of the memory elements 12 comprises an electrical conductor and a magnetic tape helically wound therearound for its entire length. Such memory elements are well known in the art and are disclosed for example, in the aforementioned patent of A. H. Bobeck. The helical tape is formed of a magnetic material having substantially rectangular hysteresis characteristics so that a magnetic state remains after being driven thereto by an applied magneto-motive force. The flat solenoids 13 encircle the parallel grouping of memory elements 12, passing in one direction on one side of the elements 12 and returning in the opposite direction on the other side of those elements. The elements 12 and solenoids 13 intersect at the crosspoints of the $xy$ coordinate array, and therefore at the bit addresses of the memory plane.

At the intersections thus resulting, the solenoids 13 are inductively coupled to the helical tapes of the memory elements 12 and, at each of the information addresses at which a permanent magnet 10 appears, the helical tape of a memory element 12 lies in the effective field of the associated permanent magnet 10. It is clear from the foregoing organization that the memory elements 12 define the word rows of the memory plane and the solenoids 13 define the corresponding bit columns, which arrangement, it will be appreciated, is precisely the reverse of the relationship of these elements found in prior art magnetic wire memory element arrangements.

At one end each of the conductors of the magnetic wire memory elements 12 is connected, through a diode 14, to a source of interrogation current 15. The latter source is shown as serving only a single memory plane and a current source for this purpose is readily devisable by one skilled in the art. Although a single memory plane is adequate to demonstrate the teaching of this invention, it is well known that a more economical arrangement organizes a plurality of the arrays of FIG. 1 into a multiplane memory. In the latter case, the source 15 advantageously may in turn comprise a coordinate array of current outputs, the latter outputs at the crosspoints of the array being connected with the conductors of the memory elements 12, respectively. Advantageously, the diodes 14 comprise stored charge diodes which are well known in the art as being able to conduct heavily in the reverse direction for some period of time immediately following forward conduction. In such diodes the storage period is controlled for particular applications and the extremely rapid recovery time ideally suits these diodes for the maximum exploitation of the high access cycle time possible with the novel memory arrangement of this invention.

Each of the conductors of the memory elements 12 is connected at its other end to a pair of return conductors 16*a* and 16*b* which pass in the opposite direction parallel to the memory element 12 and terminate at a ground strip conductor 17. The latter conductor in turn connects to a ground bus 18. The conductors 16*a* and 16*b* lie substantially equidistant from, and on each side of, the memory elements 12. Although not shown in the drawing, the memory elements 12 and the return conductors 16 may conveniently be encased in a tape of a nonmagnetic, electrically insulating material such as that known commercially as Mylar, for example. One end of each of the double flat strip solenoids 13 is connected through a sense amplifier 19 to information utilization circuits 20. The sense amplifiers 19 may each comprise circuits readily devisable by one skilled in the art for amplifying to the level required by the utilization circuits 20, the output signals generated during an interrogation of the memory of this invention. Similarly, the utilization circuits 20 may also comprise circuits well known in the art for receiving the amplified output signals from the amplifiers 19 and will conventionally comprise circuits of the system with which the present invention may be adapted for use. The details of neither the amplifiers 19 nor the utilization circuits 20 are necessary for an understanding of the present invention and are accordingly not shown in the drawing.

The other ends of the doubled strip solenoids 13 are connected to the ground conductor 18. One final element of the memory shown in the drawing, although not necessary for the operation of the memory plane such as is being described, nonetheless constitutes an important part of such an assembly. A sheet 21 of a magnetic material such as Permalloy underlies the coordinate matrices of the memory and serves to localize the fields of the magnets 10 to the vicinity of the magnets 10 and to shield the information bit addresses and the memory wire elements 12 from stray magnetic fields.

With the foregoing organization of an illustrative embodiment of this invention in mind, a typical operation thereof may now be described. For this purpose, it will be assumed that the word row lying along the $x_4$ coordinate is to be interrogated. As is evident from the disposition of permanent magnets 10 at the bit addresses of this word row, the binary word stored here contains the binary bits 0, 0, 1, 0, 0, 1. As the result of a previous interrogation, the flux in the magnetic tape of the memory element 12 of the coordinate $x_4$ is in a direction opposite to that which an initial current pulse from the diodes 14 and current source 15 tends to drive it, as is also the flux in each of the tapes of the remaining memory elements 12. Since this flux direction and the applied interrogation currents are mutually reversible, the particular directions of the flux states in the tapes of the memory elements 12 and the polarities of the currents applied from the source 15 need not be specifically determined for an understanding of this invention. However, for purposes of illustration it will be assumed that an initially positive current is selectively applied from the source 15 under control of addressing circuitry not a part of this invention. This initially positive current is applied to the diode 14′ and thus to the conductor of the memory element 12′ of the $x_4$ coordinate. As a result of the applied positive current a uniform circular field is established along the entire length of the conductor of the element 12′, a component of which operates to urge a flux switching in the helically wound tape of the latter element. Since the magnitude of the applied current is determined to be sufficient to exceed the switching threshold of the material of the magnetic tape, a flux switching occurs along the entire length of the tape of the element 12′, that is, at each point along its length at which no permanent magnet 10 appears.

At those bit addresses at which a permanent magnet 10 is coupled to the magnetic tape of the element 12′, its field saturates a segment of the tape which, as a result, is prevented from switching. The saturating field applied by a permanent magnet 10 may be in either direction. That is, the saturating field may be in the direction in which the interrogating field produced by the interrogating current tends to drive the magnetic tape or it may be in the opposite direction simply to hold the tape in the normal direction obtaining after an interrogation. In either case, a complete flux switching at the permanent magnets 10 is prevented and the only result of the applied interrogating field in most cases is a negligible flux shuttling. As is clear from this manner of applying the interrogating current, and as previously mentioned, the interrogating field is uniformly applied at each point along the helically coupled length of the magnetic tape. At this point, it may again be noted that the uniform coupling thus made possible permits a substantial reduction in the magnitude of the interrogating current.

The flux excursions, or substantial absence of such excursions as the case may be, in the magnetic tape of the element 12′ at the bit addresses, will result in output voltages being induced in the solenoids arranged along the $y$ bit coordinates. In the bit addresses of the coordinates $y_1$ and $y_2$ only a small shuttle signal will be generated in the coupled solenoid 13 as the result of the shuttling of the flux in the magnetic tape. This will also be the case at the bit addresses of the coordinates $y_4$ and $y_5$. At the addresses defined by the coordinates $y_3$ and $y_6$, on the other hand, the magnetic tape undergoes a complete flux switching as it does at every point not influenced by a permanent magnet 10. At the couplings of the solenoids 13 at the latter bit addresses the flux switching in the tape will generate output voltages indicative of the binary values stored at these points. Thus, in accordance with the information assumed to be stored in the word address of the $x_4$ coordinate, the solenoids 13 coupled to the $y_1$ through $y_6$ bit address segments of the tapes of the elements 12 will have the following output signals induced therein: $y_1$, $y_2$, $y_4$, and $y_5$ solenoids 13 will have negligible shuttle signals indicative of the presence in the corresponding interrogated addresses of binary "0's" and the $y_3$ and $y_6$ solenoids 13 will have full valued output signals generated therein indicative of the presence in the corresponding interrogated addresses of binary "1's." The output signals thus generated obviously correspond in conventional practice to the representation of the two binary values. The output signal conditions are applied to the sense amplifiers 19 where the shuttle signals are discriminated from the signals representing binary "1's" and the latter are amplified for transmission to the information utilization circuits 20.

When the positive current is applied from the source 15 to the stored charge diode 14′ to accomplish the interrogation described in the foregoing, minority carriers are injected and stored in the diode so that at the termination of positive-going current the diode can be made to conduct heavily in the reverse direction, thereby applying a negative current to the conductor of the memory element 12′ during its recovery period. This negative current serves to restore the magnetic flux in the tape of the memory element 12′ to its normal direction in preparation for a subsequent interrogation operation. At this time signals will again be induced in the coupled solenoids 13; however, these signals will be inoperative to effect the sense amplifiers 19 and hence will not be transmitted to the utilization circuits 20.

Figure 2A:
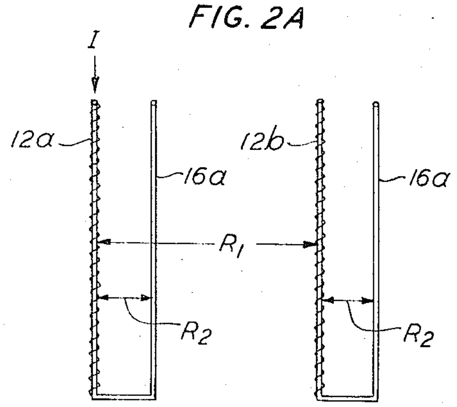
FIG. 2A depicts in simplified form prior art magnetic wire memory elements and their single return conductors.
Figure 2B:
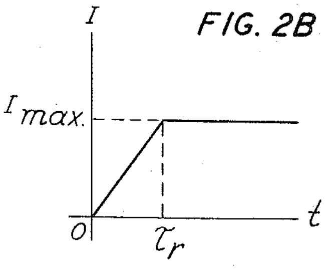
FIG. 2B is an idealized representation of an energizing current for the circuit of FIG. 2A.

Returning to the application of the positive and negative currents to the memory element 12′ via the diode 14′, a description of a circuit for these currents may now be completed. The conductor of the memory element 12′ is connected at the other end to the pair of return conductors 16*a* and 16*b* which are arranged substantially equidistant on each side of, and parallelly to, the memory element 12'. The interrogating currents return via this split path to the ground strip 17 and thereby to the ground conductor 18. The split return path is provided in accordance with one feature of this invention which advantageously virtually eliminates coupling between adjacent memory elements 12 and the driven memory element 12'. The substantial reduction in coupling thus achieved may be demonstrated by reference to the comparison diagrams of FIGS. 2A, 2B, and 2C. In FIG. 2A are shown in simplified form two adjoining memory elements **12*a* and 12*b* having only single return conductors 16*a*. The application of a current I, as indicated by the arrow at the end of the element 12*a***, will cause a voltage *e* to be induced in the adjacent memory circuit comprising the element **12*b* and its return conductor 16*a***. Assuming a current of the character shown in FIG. 2B, then $$e=-\int_s \frac{\partial B}{\partial t}\cdot ds=-\int_0^l\int \frac{\mu I_{\max.}}{2\pi\tau_r R}dR\,dl$$

$$e=-\frac{\mu I_{\max.}}{2\pi\tau_r}\left[\ln R\Big|_{R_1}^{R_1+R_2}-\ln R\Big|_{R_1-R_2}^{R_1}\right]$$

$$e=\frac{\mu I_{\max.}}{2\pi\tau_r}\ln\frac{R_1^2}{(R_1-R_2)(R_1+R_2)} \qquad (1)$$

where $s$ is the surface area between a memory element **12*a* or 12*b* and its return conductor 16*a***, B is the flux density within this area, $\mu$ is the permeability of the region within which the flux is developed, R is the distance from the memory element being energized to any given point, $\tau_r$ is the rise time of the current I, $l$ is the length of the memory element, and $R_1$ and $R_2$ are dimensions as indicated in FIG. 2A.

Figure 2C:
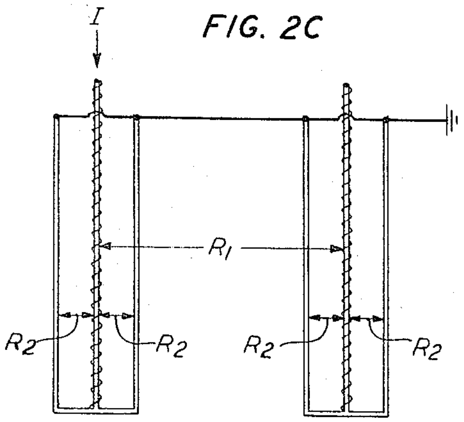
FIG. 2C depicts in simplified form magnetic wire memory elements and split return circuit means according to this invention.

In the case of the split return conductor the voltage *e* thus generated is almost eliminated as shown by the simplified diagram of FIG. 2C. Employing this construction, then $$e=\frac{\mu I_{\max.}}{2\pi\tau_r}\left[\ln\frac{R_1^2}{(R_1-R_2)(R_1+R_2)}-\frac{1}{2}\ln\frac{(R_1-R_2)^2(R_1+R_2)^2}{R_1^2(R_1-2R_2)(R_1+2R)}\right] \qquad (2)$$

assuming representative dimensions in which $R_1=0.05$ inch and $R_2=0.005$ inch, then the couplings for the simple returns of the character depicted in FIGS. 2A and 2C may be compared as follows:

*Coupling for return of FIG. 2A*

$$e=\frac{\mu I_{\max.}}{2\pi\tau_r}\ln\frac{25}{24.75}=0.01005\left[\frac{\mu I_{\max.}}{2\pi\tau_r}\right]$$

*Coupling for return of FIG. 2C*

$$e=\frac{\mu I_{\max.}}{2\pi\tau_r}\left[\ln\frac{25}{24.75}-\frac{1}{2}\ln\left(\frac{24.75}{25}\cdot\frac{24.75}{24}\right)\right]$$

$$=-0.00031\left[\frac{\mu I_{\max.}}{2\pi\tau_r}\right]$$

A comparison of the voltages induced in the two simplified arrangements of FIGS. 2A and 2C indicates that, for the split return conductor of FIG. 2C, a 97.0 percent reduction in coupling is achieved with a corresponding reduction in induced currents in adjoining memory elements.

What has been described is considered to be only one specific embodiment of this invention, and it is to be understood that various and numerous other arrangements may be devised by one skilled in the art without departing from the spirit and scope of this invention.

What is claimed is:

1. A magnetic memory matrix comprising a plurality of parallelly arranged memory conductors each having a magnetic tape helically wound therearound, each of said tapes having substantially rectangular hysteresis characteristics, said memory conductors defining a plurality of binary word rows in said matrix, a plurality of parallel sensing conductors coupled transversely to said tapes and defining a coordinate array of address segments on said tapes, means including a current source for applying a bipolar interrogate current to a selected one of said memory conductors for flux switching to opposite states of remanent magnetization the entire length of the tape of said selected memory conductor, means for preventing said flux switching at particular ones of said address segments of said tapes comprising a plurality of permanent magnets arranged so as to have their fields maintain only said particular address segments of said tapes in one state of remanent magnetization; and means for detecting signals induced in said sensing conductors by said flux switching.

2. A magnetic memory matrix as claimed in claim 1 in which said current source includes a stored charge diode connected to said selected memory conductor.

3. In a magnetic memory arrangement having rows and columns of bit addresses, the combination comprising a plurality of permanent magnets arranged at particular addresses of said rows in accordance with the bits of stored binary information, and means for reading out said information comprising a plurality of first conductors arranged along said rows, each of said first conductors having a magnetic tape having substantially rectangular hysteresis characteristics helically wound therearound, each of said tapes lying in the fields of said permanent magnets where they appear at said bit addresses, an energizing circuit means including a bipolar current source, a selected one of said first conductors, and a return conductor means for generating flux switching fields along the length of said selected first conductor, and a plurality of second conductors arranged along said columns and inductively coupled to the tapes of said first conductors at said bit addresses.

4. In a magnetic memory arrangement as claimed in claim 3, said bipolar current source including a stored charge diode and said combination also comprising a plurality of sense amplifiers connected respectively to said plurality of second conductors.

5. In a magnetic memory arrangement as claimed in claim 3, said return conductor means comprising a pair of leads arranged substantially equidistant on each side of said selected first conductor.

6. A magnetic memory matrix comprising a plurality of parallelly arranged memory conductors each having a magnetic tape helically wound therearound, each of said tapes having substantially rectangular hysteresis characteristics, said memory conductors defining a plurality of binary word rows in said matrix, a plurality of sensing conductors parallelly coupled transversely to said tapes and defining a coordinate array of address segments on said tapes, current source means having a stored charge diode connected to each of said memory conductors for selectively applying bipolar interrogate currents to said memory conductors for flux switching to opposite states of remanent magnetization the entire lengths of the tapes of said memory conductors, a plurality of return circuit means for each of said memory conductors, each of said circuit means comprising a first and a second return conductor lying parallel to and substantially equidistant on each side of a memory conductor, means for preventing said flux switching at particular ones of said address segments of said tapes comprising a plurality of permanent magnets arranged so as to have their fields maintain only said particular address segments of said tapes in one state of remanent magnetization, and means including a sense amplifier connected to each of said sensing conductors for detecting signals induced in said sensing conductors by said flux switching.

7. In a magnetic memory arrangement, a plurality of parallelly arranged magnetic wire memory elements each comprising an electrical first conductor having a magnetic tape helically wound therearound, means for selectively applying energizing currents to said first conductors, and means for reducing coupling between a selected first conductor and its adjoining first conductors comprising a plurality of pairs of second conductors parallelly arranged with said first conductors, the conductors of each of said pairs being arranged equidistant from and on each side of a first conductor, and means for connecting each conductor of each of said pairs to the output end of a first conductor.

References Cited by the Examiner

UNITED STATES PATENTS

| | | | |
|---|---|---|---|
| 3,060,411 | 10/1962 | Smith | 340—174 |
| 3,084,336 | 4/1963 | Clemons | 340—174 |
| 3,133,271 | 5/1964 | Clemons | 340—174 |
| 3,173,132 | 3/1965 | Bobeck | 340—174 |
| 3,209,333 | 9/1965 | Russell | 340—174 |
| 3,221,313 | 11/1965 | Gianola | 340—174 |

BERNARD KONICK, *Primary Examiner.*

S. M. URYNOWICZ, *Assistant Examiner.*